Aug. 4, 1959
C. VOLFF
2,898,516
ELECTRIC ARC INITIATING AND STABILIZING APPARATUS
Filed May 2, 1955
2 Sheets-Sheet 1
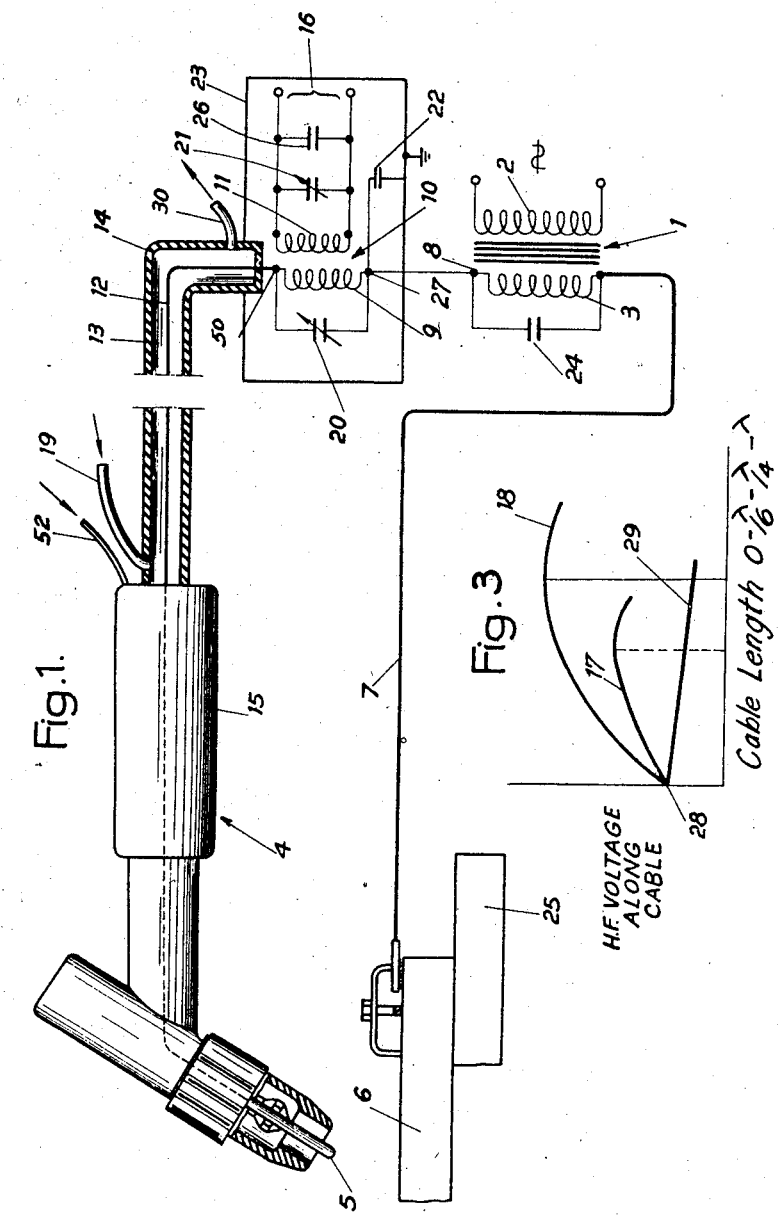
Inventor
Charles Volff
By
Attorney

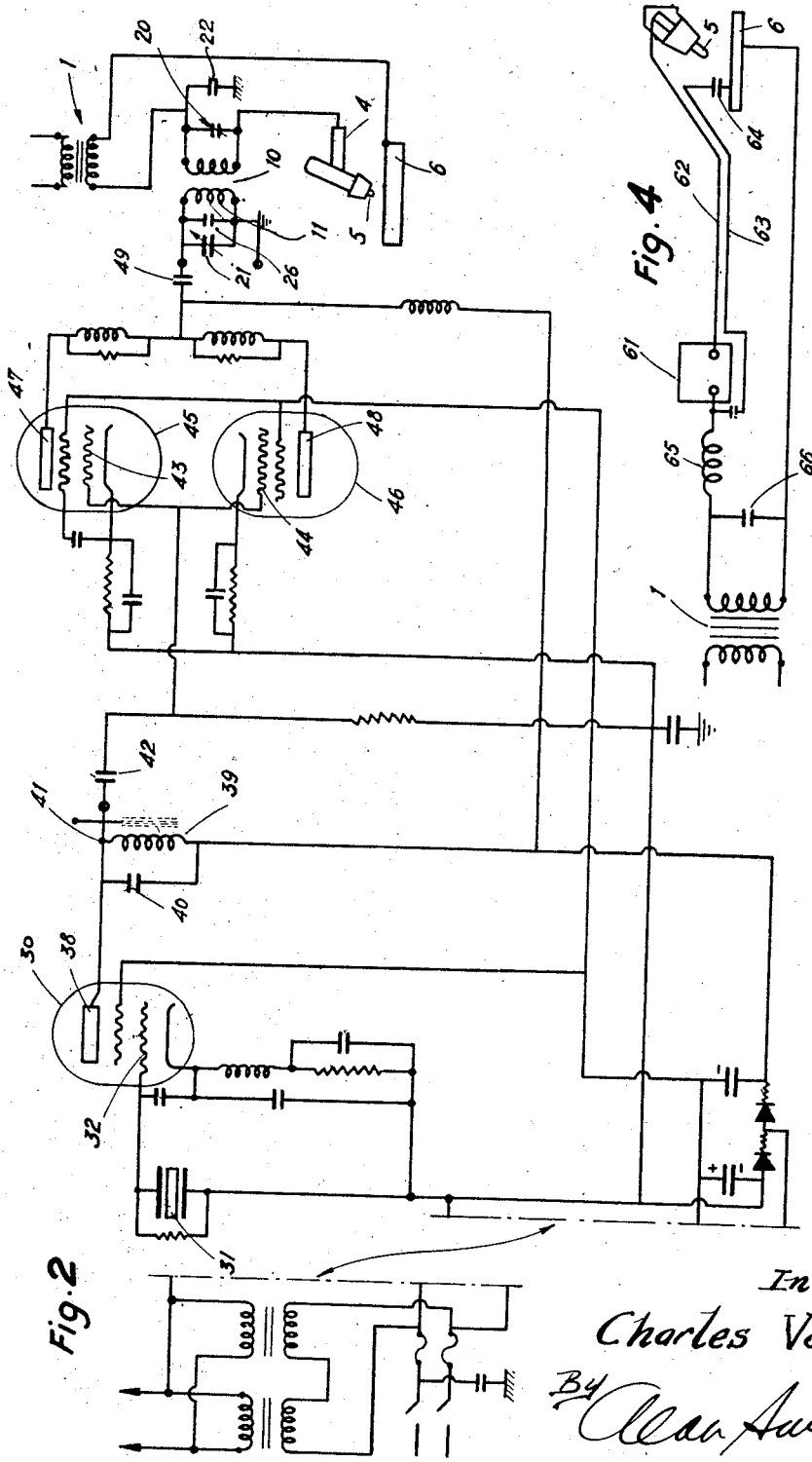

United States Patent Office 2,898,516
Patented Aug. 4, 1959

2,898,516

ELECTRIC ARC INITIATING AND STABILIZING APPARATUS

Charles Volff, Montreal, Quebec, Canada

Application May 2, 1955, Serial No. 505,235

5 Claims. (Cl. 315—170)

The present invention relates to a generator of high frequency oscillations, adapted for being coupled to an arc welding circuit for starting and stabilizing a welding arc.

More specifically, the invention relates to a welding circuit of the kind disclosed in U.S. Patent No. 2,574,514, in the name of Charles Volff et al., an essential feature of which consists in providing a non-radiating resonant line for connecting a welding torch to a high frequency generator tunable within a narrow frequency band upwards of about 10 megacycles per second, such as for instance the 13.56 and the 27.32 megacycles wavebands which have been assigned by public authorities for such apparatus.

In the above-identified prior patent, the input end of the resonant line is coupled to the high frequency generator by a single transformer, the primary winding of which is identified as L5 in Figure 3 of the prior patent, and is connected across the output of this generator. This primary winding L5 is tuned to the frequency of this generator by means of a parallel-connected capacitor C7. The secondary winding L6 of this transformer is inserted in series in the arc welding circuit.

It is an object of the present invention, to improve the performance of an arc welding system of the above-described kind, by providing a better high frequency energy transfer from the high frequency generator to the welding torch, irrespective of the open or closed circuit condition of the secondary high frequency circuit. The open-circuit condition exists before the arc is started. The load impedance at the output end of the resonant line, i.e. at the welding torch is then very high, and consequently the input impedance into the resonant line is very low. The length of the resonant line is adjusted to produce a voltage maximum or loop at the output end, sufficient to jump the welding arc gap and to ionize the arc path without having to bring the welding electrode in contact with the work-piece. However, when the arc path becomes ionized, its apparent impedance becomes much lower, in the range of about 100 to 300 ohms, so that the energy transfer parameters in the high frequency circuit become entirely different. In order to sustain a high frequency discharge across this low-impedance arc gap, for stabilizing the welding arc, it is desirable to maintain a relatively high intensity of the high frequency current across the arc gap. Conventional welding systems using a high frequency generator do not satisfy the requirement of a good energy transfer under both types of load condition at the torch, namely high impedance or low impedance. Consequently, very powerful generators have to be used, causing wastage of power and excessive radiation, which interferes with radio broadcast.

When the high frequency arc is established, the losses are even stronger because the load impedance represented by this arc is very different from the output impedance of the generator. The need to avoid these drawbacks is clearly set forth in U.S. Patent No. 2,561,995, in the name of W. L. Roberts. According to this patent, automatic control means are provided for varying the effective impedance of the coupling means connecting a high frequency oscillator to a welding circuit and for varying the oscillator output impedance. However, this patent does not contemplate the use of a resonant line as part of the coupling means between the oscillator and the welding torch, which is nevertheless a very desirable feature because of the good energy transfer characteristics of such a line, and also because of its non-radiating characteristic. Therefore, a very desirable improvement would consist in combining the respective advantages of a resonant line connection between the generator and the torch, with these of an automatic impedance control such as disclosed by the Roberts patent.

It is an object of the present invention to achieve such an improvement.

According to the present invention, a welding system is provided in which the high frequency generator is coupled in known manner to the welding torch by a single tuned transformer, the secondary winding of which is connected in the welding circuit in series with a resonant line extending to the torch, the essential novel feature of this system being that the coupling transformer is a step-down transformer. More specifically, the ratio of this transformer is adapted for showing across its primary winding an image impedance of the apparent impedance of the high frequency arc matched with the optimum load impedance of the generator.

This feature will be more readily understood from the following example, in which it will be assumed that the optimum load impedance $Zg$ of the generator is about 1,500 ohms (a usual value with conventional power tetrodes such as the No. 807 type, operating in push-pull or in parallel connection, as shown in the Volff Patent No. 2,574,514, referred to hereinabove), and that the apparent impedance $Zs$ of the high frequency arc is approximately 200 ohms. This apparent impedance is of the same order as the characteristic impedance of a transmission line of the kind considered in the prior Volff patent. Therefore, the input impedance into the line may practically be considered as being of the same order as the apparent impedance of the high frequency arc. Consequently, if the generator load impedance $Zg$ is 1,500 ohms the optimum transformer turns ratio, for matching $Zg$ with $Zs$, will be $$\sqrt{\frac{Zg}{Zs}} = 2.74$$

Taking into account the operating frequency, for example 13.56 mhz., and the need to tune the transformer primary to this frequency, a primary winding with some 7 turns will be found suitable, in which case the secondary should have about 2½ turns.

This is a radical departure from prior systems in which, whenever a single high frequency coupling transformer was used, this transformer was a step-up transformer. This prior practice appears to have resulted from the belief that a step-up transformer was always necessary for delivering at the torch an open-circuit voltage sufficiently high for breaking across the arc gap.

However, the novel feature according to the present invention unexpectedly provides for an excellent impedance matching not only when the high frequency arc is established, but also when the secondary high frequency circuit is open, under which condition a high voltage is required at the torch for breaking across the arc gap.

This good performance is evidenced by the fact that, when the length of the resonant line is properly adjusted for resonance, a luminous or corona discharge is visible about the welding electrode, at least when this electrode is hot and is shielded by a stream of shielding gas such as argon, having a relatively low dielectric strength as compared with air. The presence of this luminous discharge is a clear evidence of the fact that with the device according to the present invention, a very high voltage is obtained between the welding electrode and the ground, when the high frequency secondary circuit is in open-circuit condition, in spite of the fact that the secondary of the step-down coupling transformer has a relatively low output voltage and a low output impedance.

According to the present invention, use is made, for the first time in a device of the kind considered, of the property of quarter-wave resonant lines, according to which the input impedance $Zi$ into such a line is $Zi = Zo^2/Zt$, $Zo$ being the characteristic impedance of the line and $Zt$ the load impedance, represented in the present case by the arc gap. Under open-circuit conditions, $Zt$ is very large, and consequently, $Zi$ is very small and correctly matched with the low output impedance of the step-down transformer.

According to a further feature of the present invention, a preferred turns-ratio for the step-down transformer is comprised between about 2 and 5. One preferred design, for a generator having an optimum load impedance of about 1,500 ohms, operating on the 13.56 megacycles industrial waveband, is about 7 to 2.

For a more complete understanding of the nature and scope of the invention, reference may be made to the following detailed description of a preferred apparatus according to the invention, which may be read in connection with the accompanying drawing given by way of example, in which:

Figure 1 is a schematic view of an arc welding system embodying the invention in one of its forms.

Figure 2 is a diagrammatic view of the high frequency generator.

Figure 3 is a graphic representation of the high frequency voltage in respect with the length of the welding conductor.

Figure 4 is a schematic view of an arc welding system embodying the invention in another of its forms.

The preferred embodiment of the invention will now be described in detail by reference to the drawings. Critical and preferred characteristics of apparatus of this general nature have been given above and can readily be co-related with the detailed description to follow.

Referring to Figure 1, 1 is a welding current transformer having a primary winding 2 coupled to a suitable source of alternating current and a secondary winding 3 designed to provide a welding current to the circuit comprising an electric holder 4 in which an electrode 5 is connected to the terminal 8 of the secondary 3, and a work piece 6 connected through conductor 7 to the other terminal of the secondary 3. In the conductor connecting the terminal 8 and the electrode 5 is connected in series the secondary winding 9 of a transformer 10 forming part of a high frequency generator the wiring of which is represented in Figure 2.

This generator includes an oscillator stage followed by an amplifier stage for isolating the oscillator stage from the variations of the characteristics of the output circuit which is a part of the welding circuit.

The oscillator stage comprises a tube 30 of the tetrode type, controlled by a 6.78 megacycle quartz crystal 31 mounted in series in the circuit of the control grid 32. The anode 38 of the tube 30 is supplied with direct current through an inductance coil 39 with adjustable powdered iron core, constituting with the condenser 40 a parallel tuned circuit, tuned to the double frequency of the quartz crystal. The high frequency voltage appearing between the terminal 41 of the coil 39 and ground is applied through condenser 42 to the control grids 43, 44 of two tetrode tubes 45, 46 connected in parallel. The plates 47, 48, of these tubes are connected through condenser 49 to the primary winding 11 of the coupling transformer 10 whose secondary winding is in series with the welding conductor connecting the transformer 1 to electrode 5.

The primary winding 11 is tuned by a fixed condenser 26 and a variable condenser 21.

Between the secondary winding 9 and the welding torch 4, the welding current to which is superimposed a high frequency current is conducted through conductor 12 cooled by water flowing in the space 13 existing between the conductor 12 and an isolating hose 14 preferably of vinyl resin.

The water cooling the conductor 12 enters through tubing 19, flows around the conductor 12 and comes out of tubing 30.

The high frequency current flows through the circuit constituted as follows conductor 12, arc path electrode 5 work 6, welding table 25 on which is set the work, ground, metallic shield 23 of the high frequency generator, capacitor 22, and terminal 27 of the winding 9. A part of the high frequency current flows also through the conductor 7 and through the condenser 24 which by-pass the secondary winding 3 of the welding transformer and welding conductor, connecting terminals 8 and 27. The insulating handle 15 of the electrode holder is preferably made of an insulating material of low dielectric loss at the high frequency produced by the generator, which is of the order of at least several megahertz. This insulating material is preferably of polystyrene or other insulating material having similar dielectric properties at the frequencies ranging about several megacycles. The transformer 10, the primary winding of which is tuned to the frequency of the oscillator has a primary to secondary ratio such that the apparent impedance of the secondary be nearly equal to the resistance of the high frequency arc between electrode and work the intensity of which is sufficient to stabilize the arc and to provide satisfactory welding.

*Example*

An example of welding aluminum with a non-consuming electrode 5 surrounded by a flow of argon as shielding gas entering the electrode holder 4 through tubing 52 will be given. The high frequency current necessary to stabilize an arc of 100 amperes ranges about 0.3 ampere and the corresponding resistance of the arc is comprised between 100 and 300 ohms. According to a feature of the invention, the length of the conductor 12 between the terminal 50 of the secondary winding 9 and the electrode 5 is comprised between one-eighth and one-fourth of the wavelength of the high frequency and preferably about one-sixth of this wavelength.

With a conductor 12 of copper one-eighth of an inch in diameter and a rubber insulating hose 14 having an inner diameter of one-fourth of an inch, full of water, and the generator being tuned to a frequency of 13.56 megacycles the length of the conductor giving the stronger arc and the best welding is about 13 feet.

When the generator is tuned at a frequency of 13.56 megahertz and has an output stage consisting of two electronic tubes 45, 46 having each a load resistance of 1500 ohms as the tubes of the type 807, the transformer 10 comprises a primary winding 11, 57 millimeters long, having seven turns of enameled wire 1.5 millimeter diameter and a secondary winding 9, 32 millimeters long consisting of two turns 53 millimeters diameter of copper tube, 11 millimeters diameter.

The primary is tuned by a fixed mica capacitor of 50 micromicrofarads and an adjustable capacitor of 100 micromicrofarads, both capacitors being connected in parallel to the primary winding. The secondary winding 9 is tuned by a variable capacitor 20 of about 100 micro-microfarads.

The terminal 27 of the secondary is connected to the grounded metallic shield of the high frequency generator through a capacitor 22. The value of this capacitor is one microfarad. This value is abnormally high in respect to the high frequency utilized and helps to compensate the low inductive reactance of the transmission line constituted by the welding conductor 12 the length of which is less than a quarter of the wavelength.

With the above-mentioned values of the welding circuit, and for the welding of aluminum, with a tungsten electrode 5, it has been established that a high frequency arc of about 300 milliamperes is strong enough to stabilize the welding arc. The open high frequency voltage is sufficient to produce a luminous or corona discharge about the electrode in a stream of argon utilized as shielding gas, when the electrode is hot.

The open high frequency voltage along the welding conductor, i.e., the voltage when the electrode is far from the work, varies as indicated by the curve 17 of Figure 3 representing the variation of voltage between electrode and ground in terms of the length of the conductor 12 connecting the electrode to the secondary coil 9 of the coupling transformer 10.

According to the properties of the transmission lines, the voltage along a conductor without high frequency losses is represented by the curve 18 of Figure 3, having a maximum for a length equal to the quarter of the wavelength. Nevertheless, on account of the losses in the dielectrics surrounding the conductor said losses increasing with the length of the conductor and nearly as the square of the voltage, the maximum of the open circuit voltage is being obtained at the end of a conductor the length of which is less than one-quarter of the wavelength.

When the high frequency arc is established, the resistance of the arc gap electrode work being nearly equal to the characteristic impedance of the line, constituted by the conductor 12 there are no more standing waves along the line and the line losses are the lowest for a given welding conductor. The high frequency voltage along the line is then slowly decreasing as represented by curve 29 of Figure 3. The voltage across terminals of the secondary 9 must therefore be somewhat larger than the voltage necessary to sustain the high frequency arc across electrode 5 and work piece 6.

The circuit according to the invention is well suited to produce at the tip of the electrode an open high frequency voltage high enough to permit initiation of the high frequency arc at the start of the welding and at each extinction of the welding arc, in case of welding with alternating current and to energize the high frequency arc with a sufficiently strong intensity producing a very quick reinitiation of the welding arc necessary to obtain good welding.

Referring to Figure 4, the high frequency generator 61 is connected to the welding electrode 5 through conductor 62 and the high frequency current returns through a conductor 63 disposed in parallel relation and in close proximity to the conductor 62. This conductor 63 is connected to the work piece 6 through a capacitor 64. At the other end this conductor is connected to the terminal 67 of the high frequency generator 61. The protection of the welding transformer 1 is provided by a high frequency choke coil 65 and capacitor 66. These two parallel conductors constitute a non-radiating two-conductor transmission line, having low radiation losses.

The two parallel conductors 62, 63 can be replaced by a concentric cable having the same properties as the two conductor line and a characteristic impedance matched to the resistance of the high frequency arc, i.e., nearly equal to the said resistance.

If the high frequency generator is of sufficient power to compensate the line losses, the conductor 12 connecting the secondary winding 9 and the electrode 5 can have a length approximately preferably slightly less than an odd multiple of a quarter of the wavelength, preferably from about 7 to about 13 feet.

This application is a continuation-in-part of application Serial No. 241,609 filed August 13, 1951, now forfeited.

I claim:

1. In an electric arc welding system comprising a welding torch, a source of welding current, a generator of high frequency oscillations comprised within a narrow frequency band upwards of about 10 megacycles per second, and means for connecting said generator to said welding torch, the combination of a step-down tuned transformer permanently connected across the output of said generator with a quarter-wave resonant line extending from one terminal of the secondary of said transformer to said torch, the other terminal of said secondary being connected to one pole of said welding current source, and the other pole of said source being connected to a workpiece which is to be welded, whereby optimum transfer of high-frequency energy is obtainable from said generator to said torch irrespective of the load condition prevailing at said torch.

2. An arc welding system according to claim 1, in which a capacitor comprised between about 0.5 and about 2 microfarads is connected between the ground and the secondary terminal of said step-down transformer connected to the welding current source.

3. A generator of high frequency oscillations comprised within a narrow frequency band upwards of about 10 megacycles per second for starting and stabilizing a welding arc, comprising, an oscillator stage, an amplifier stage and a single output tuned transformer for connecting said amplifier stage to an arc welding circuit which comprises a resonant line extending from said transformer to an arc welding torch, said generator being characterized by said output transformer being a step-down transformer.

4. A high frequency generator according to claim 3, in which the ratio of the output transformer is adapted for matching the output impedance of the amplifier with the apparent impedance of an operating arc welding circuit, said apparent impedance being of the order of about 100 ohms to about 300 ohms.

5. A high frequency generator according to claim 4, in which the load impedance of the amplifier is of the order of 1,500 ohms, characterized by the ratio of turns of the output transformer being approximately comprised between 2 and 5.

References Cited in the file of this patent

UNITED STATES PATENTS

| | | |
|---|---|---|
| 2,495,183 | Roberts | Jan. 17, 1950 |
| 2,532,807 | Girard et al. | Dec. 15, 1950 |
| 2,561,995 | Roberts | July 24, 1951 |
| 2,574,514 | Volff et al. | Nov. 13, 1951 |